C. G. SMITH.
VEHICLE SPRING.
APPLICATION FILED JUNE 15, 1914.
1,223,631.
Patented Apr. 24, 1917.
2 SHEETS—SHEET 1.
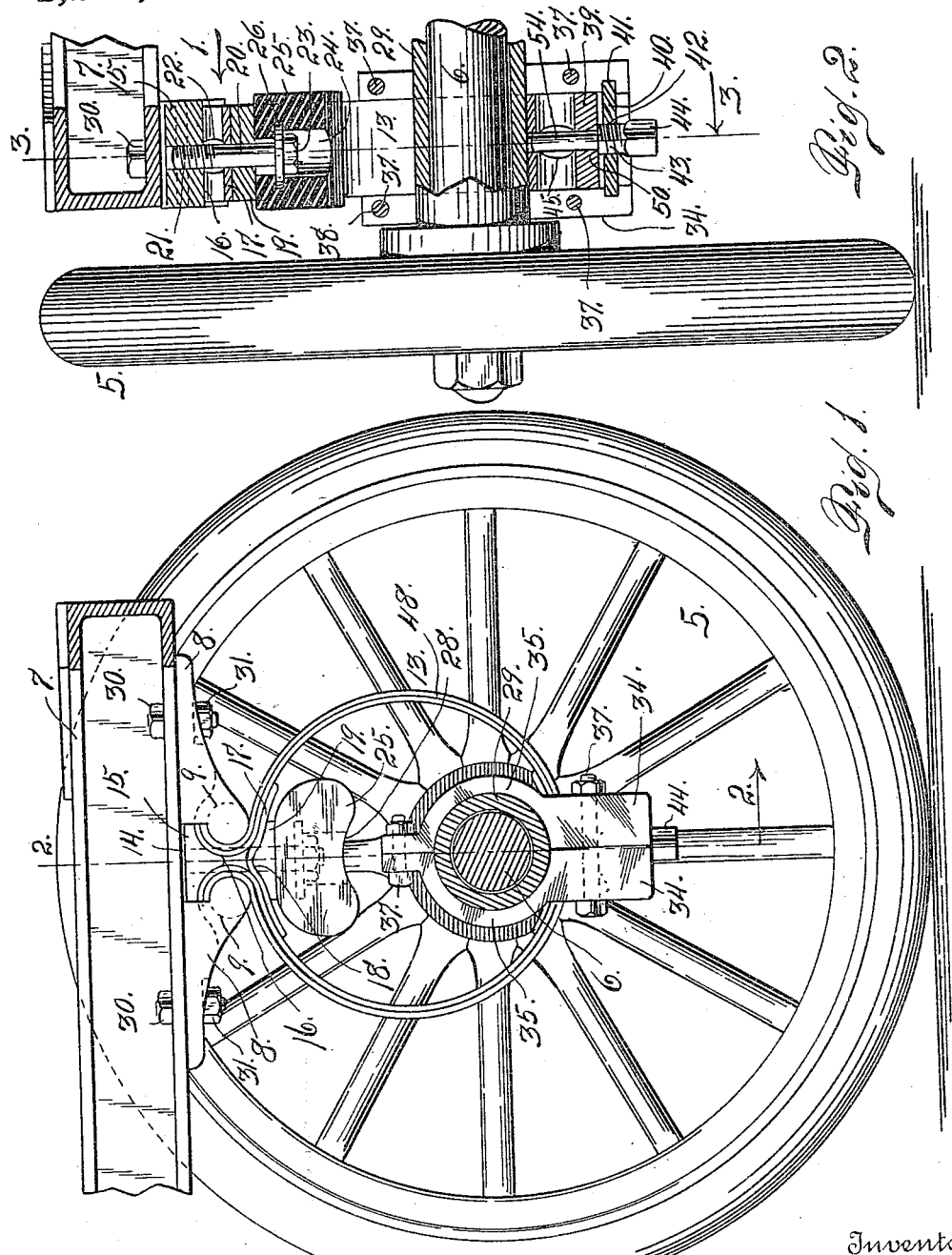
Witnesses
Otto E. Hoddick.
N. Ebert O'Brien.
Inventor
Cicero G. Smith
By
A. J. Osborne
Attorneys

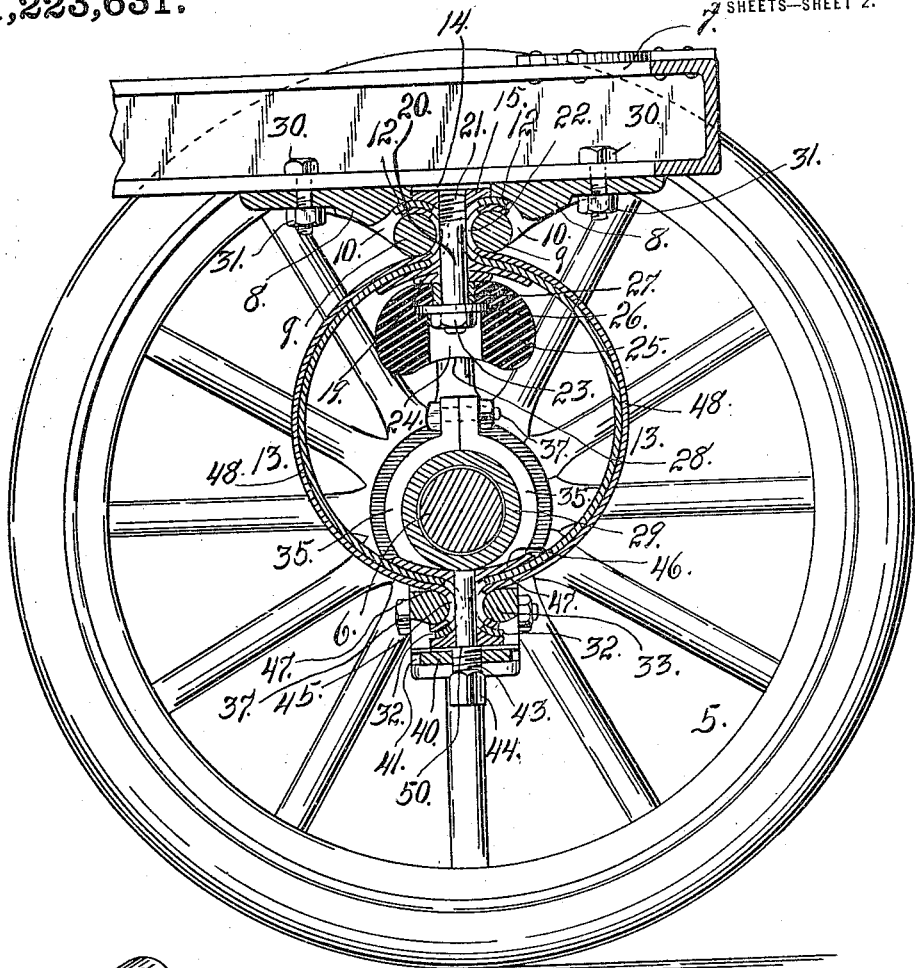
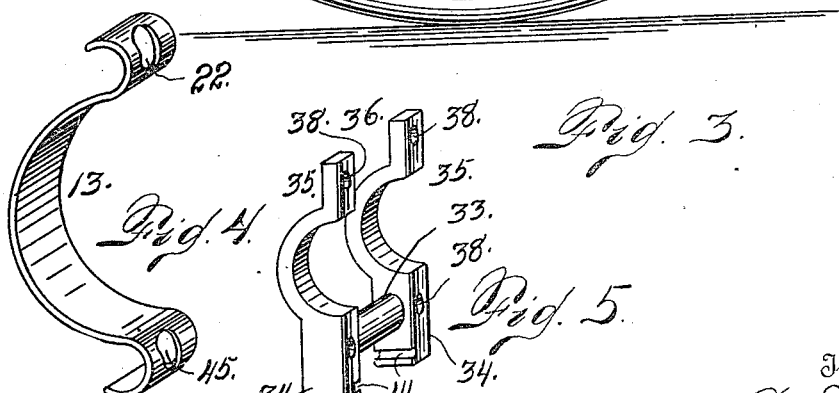

UNITED STATES PATENT OFFICE.

CICERO G. SMITH, OF PALISADES, COLORADO.

VEHICLE-SPRING.

1,223,631.

Specification of Letters Patent.

Patented Apr. 24, 1917.

Application filed June 15, 1914. Serial No. 845,046.

*To all whom it may concern:*

Be it known that I, CICERO G. SMITH, a citizen of the United States, residing at Palisades, county of Mesa, and State of Colorado, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in springs for vehicles, my object being to provide an efficient spring of this character which, while adapted for use on vehicles generally, is more especially intended for use on automobiles or motor-driven vehicles. In my improved construction, I employ a spring preferably of circular shape, composed of two members, each member being normally semi-circular in shape approximately, whereby, when the two members are brought together in the assembled relation, they form a circular yielding device forming a support for the body of the vehicle, and suitably connected with the axle. Four of these springs may be employed for each vehicle, two being located in front and two in the rear, and suitably spaced. However, as the springs applied to any vehicle would be substantially identical, a description of one spring or unit, will be a description of all.

Having briefly outlined my improved construction, I will proceed to describe the same in detail, reference being made to the accompanying drawing, in which is illustrated an embodiment thereof. In this drawing,—

Figure 1 is a side elevation of one of the wheels of a vehicle, and a portion of the body thereof, the latter being supported by one of my improved springs, the axle and a portion of the bearing therefor being shown in section. This is a view looking in the direction of arrow 1, Fig. 2.

Fig. 2 is a section taken on the line 2—2, Fig. 1, looking toward the right.

Fig. 3 is section taken on the line 3—3, Fig. 2, looking toward the left.

Fig. 4 is a perspective view in detail of one member of one of my improved springs.

Fig. 5 is a similar view of one of the half bearings for the axle of the vehicle.

The same reference characters indicate the same parts in all the views.

Let the numeral 5 designate the vehicle wheels, which it may be assumed are connected with the axle 6 in such a manner as to rotate the latter during the travel of the vehicle. Suitably arranged above the axle is the body member 7, to the lower surface of which are applied two plates 8, which are identical in shape, their inner extremities 9 being formed approximately cylindrical in shape, the plates being cut away, as shown at 10, between the ends of these cylindrical parts, to permit the entrance of the upper extremities 12 of the spring members 13, which extremities 12 are curved to fit the cylindrical parts 9 of the plates, and are free to move in the slots or openings 10 during the vibration or upward and downward movement of the vehicle body. The upper portions of the plates 8 are spaced as shown at 14 to receive a block 15, whose central portion is curved downwardly, as shown at 16, to fit the extremities 12 of the springs between which the plate is interposed, and whereby the spring extremities are properly held and guided to properly perform their function. Below the extremities 12 of the spring members and fitting the said members where they approach each other and merge into the parts 12, is a plate 17, whose central portion is bent upwardly as shown at 18, whereby it is formed slightly V-shaped to fit the lower parts of the extremities 12 of the spring members. Below this plate 17 is a second plate or washer, 19, the two parts 17 and 19 being perforated to receive a bolt 20, which is passed upwardly therethrough, between the extremities 12 of the spring members and threaded into the central part of the block 15, as shown at 21. The inner portions of the extremities 12 of the spring members are slotted or cut away as shown at 22 to receive the opposite sides of the bolt, whereby the extremities of the spring members are adapted to move freely in the performance of their function, while they are still retained in operative relation with the other parts by the bolt 20.

The head 23 of the bolt is inserted in an opening 24 formed in a buffer 25 preferably composed of rubber and connected with the upper portion of the spring members by means of the bolt. A washer 26 is embedded in this buffer and as illustrated in the drawing, cast integral therewith. Between the washer 26 and the washer 19 is a spacing sleeve 27, through which, as well as the perforated parts 17 and 19, the bolt 20 passes. This buffer is arranged at a suitable distance above the axle to allow the necessary vertical vibration or upward and downward movement of the vehicle body. Its under surface is curved, as shown at 28, to conform approximately with the cylindrical shape of the housing 29 of the axle 6.

The plate members 8 are secured to the body of the vehicle by suitable fastening devices, as bolts 30, to which nuts 31 are applied.

The lower extremities 32 of the spring members are curved, whereby they are of the same shape, approximately, as the upper extremities 12, heretofore described. These lower extremities are curved around webs 33, which connect the lower portions 34 of parts 35 composing bearing members 36, there being two of the latter which are connected by horizontally disposed bolts 37 arranged both above and below the axle, the parts 35 being perforated as shown at 38 to receive these bolts.

Below the extremities 32 of the spring members and engaging the same is a block 39, whose upper surface is curved to fit the curved adjacent extremities 32 of the spring members. This block is held in place by a plate 40 which is inserted in grooves 41 formed in the lower portions of the bearing members 36 below the webs 33. This plate 40 has a threaded perforation 42 adapted to receive the threaded part 43 of a bolt 44. The block 39 is perforated to receive the reduced shank part 54 of this bolt, which passes between the spring extremities 32 and engages elongated openings 45 formed therein, which are substantially of the same shape as the upper openings 42 formed in the extremities 12 of the spring members, as heretofore explained. The upper extremities of the bolts 44, bear against the lower surface of the housing 29 of the axle, after passing through a plate 46 located above and engaging the curved portions 47 of the spring members, just before they merge into the curved extremities 32. The lower surface of this plate 46 is shaped to fit the adjacent surfaces of the spring members.

As illustrated in the drawing, it is preferred to form each of the spring members 13 of a plurality of parts 48, which are of corresponding shape and size, the said parts of each member being in direct engagement with each other. While in the drawing each member is composed of two parts, it is evident that a greater number may be employed, if desired, depending upon the rigidity or stiffness which the use to which the springs are to be put, may require.

Attention is called to the fact that the bolt 44 is shouldered as shown at 50, at the junction of the threaded part 43 and the shank 54. This shoulder engages the block 39 and supports it in proper position with reference to the extremities 32 of the spring members 13.

As illustrated in the drawing, the extremities 32, as well as the lower portions of the spring members 13 where they merge into the extremities 32, are located below the axle 6 and connected with the lower portions of the axle bearings composed of the members 36, as heretofore explained. This is the preferred manner of applying the spring, though if desired, it may be located entirely above the axle without departing from the spirit of the invention, as defined by the appended claims.

In the construction illustrated in the drawing, the housing sleeve 29 which surrounds and incloses the portion of the axle 6 between the wheels, is clamped between the members 36 of the bearings by means of the bolts 37, whereby the said housing member is held stationary, while the axle 6 rotates with the wheels. It is evident, however, that the invention is not in any way limited to this particular construction and arrangement of axle and housing.

From the foregoing description, the use and operation of my improvement will be readily understood, and need not be described further in detail.

Having thus described my invention, what I claim is,—

1. The combination with the body and axle of a vehicle, of a spring composed of two approximately semi-circular members brought into coöperative proximity to form a circular device, the extremities of the spring members being outwardly curved and the body and axle of the vehicle being equipped with parts which the curved extremities of the spring members movably engage.

2. The combination with the body and axle of a vehicle, of a spring composed of two approximately semi-circular members brought into coöperative proximity to form a circular device, the extremities of the spring members being outwardly curved, the body and axle of the vehicle being equipped with parts which the curved extremities of the spring members movably engage, and means applied to the spring extremities for supporting and guiding them in coöperative relation with their engaging parts.

3. The combination with the body and axle of a vehicle, of a spring composed of two approximately semi-circular members brought into coöperative proximity to form a circular device, the extremities of the spring members being outwardly curved, the body and axle of the vehicle being equipped with parts which the curved extremities of the spring members movably engage, means applied to the spring extremities for supporting and guiding them in coöperative relation with their engaging parts, the said means including upper and lower plates, and bolts passing therethrough and extending between the extremities of the spring members.

4. The combination with the body and axle of a vehicle, of a spring composed of two approximately semi-circular members brought into coöperative proximity to form a circular device, the extremities of the spring members being outwardly curved, the body and axle of the vehicle being equipped with parts which the curved extremities of the spring members movably engage, means applied to the spring extremities for supporting and guiding them in coöperative relation with their engaging parts, the said means including upper and lower plates, and bolts passing therethrough and extending between the extremities of the spring members, the latter having openings to receive the shanks of the interposed bolts.

5. The combination with the body and axle of a vehicle, of a spring composed of two approximately semi-circular members brought into coöperative proximity to form a circular device, the extremities of the spring members being outwardly curved, and the body and axle being respectively equipped with parts which the curved extremities of the spring members engage, and means applied to the spring extremities for supporting and guiding them in coöperative relation with their engaging parts, said means comprising plates engaging the spring extremities interiorly, blocks engaging said extremities exteriorly, and bolts passing through said plates and blocks.

6. The combination with the body and axle of a vehicle, of a spring composed of two approximately semi-circular members brought into coöperative proximity to form a circular device, the extremities of the spring members being outwardly curved, and the body and axle being respectively equipped with parts which the curved extremities of the spring members engage, and means applied to the spring extremities for supporting and guiding them in coöperative relation with their engaging parts, said means comprising plates engaging the spring extremities interiorly, blocks engaging said extremities exteriorly, and bolts passing through said plates and blocks, the spring extremities having openings to receive the shanks of the bolts on opposite sides.

7. The combination with the body and axle of a vehicle, of a spring composed of two approximately semi-circular members brought into coöperative proximity to form a circular device, the extremities of the spring members being outwardly curved, and the body and axle being respectively equipped with parts which the curved extremities of the spring members engage, and means applied to the spring extremities for supporting and guiding them in coöperative relation with their engaging parts, said means comprising plates engaging the spring extremities interiorly, blocks engaging said extremities exteriorly, bolts passing through said plates and blocks, the spring extremities having openings to receive the shanks of the bolts on opposite sides, and a buffer held in place by the upper bolt and located within the area of the circle of the spring and above the axle of the vehicle.

8. The combination with the body and axle of a vehicle, of spring members approximately semi-circular in shape and arranged in coöperative proximity to each other to form a circular device, each member consisting of a plurality of engaging parts, the extremities of the spring members being outwardly curved both above and below, their upper extremities being movably connected with the body of the vehicle and their lower extremities movably supported from the axle.

9. The combination with the body and axle of a vehicle, of spring members approximately semi-circular in shape and arranged in coöperative proximity to each other to form a circular device, each member consisting of a plurality of engaging parts, the extremities of the spring members being outwardly curved both above and below, their upper extremities being movably connected with the body of the vehicle and their lower extremities movably supported from the axle, blocks applied to the exterior parts of the spring extremities, plates applied to the interior parts of the spring extremities, and bolts passing through said plates and having their shanks interposed between the extremities of the spring members, the said spring extremities being provided with openings which the shanks of the bolts enter on opposite sides.

10. The combination with the body and axle of a vehicle, of spring members approximately semi-circular in shape and arranged in coöperative proximity to each other to form a circular device, each member consisting of a plurality of engaging parts, the extremities of the spring members being outwardly curved both above and below, their upper extremities being movably connected with the body of the vehicle and their lower extremities movably supported from the axle, blocks applied to the exterior parts of the spring extremities, plates applied to the interior parts of the spring extremities, bolts passing through said plates and having their shanks interposed between the extremities of the spring members, the said spring extremities being provided with openings which the shanks of the bolts enter on opposite sides, and a buffer located within the circle of the spring and suspended by the uppermost bolt, the latter being threaded into the uppermost spring-extremity-engaging block.

11. The combination with the body and axle of a vehicle, of spring members approximately semi-circular in shape and arranged in coöperative proximity to each other to form a circular device, each member consisting of a plurality of engaging parts, the extremities of the spring members being outwardly curved both above and below, their upper extremities being movably connected with the body of the vehicle and their lower extremities movably supported from the exterior parts of axle, blocks applied to the exterior parts of the spring extremities, plates applied to the interior parts of the spring extremities, bolts passing through said plates and having their shanks interposed between the extremities of the spring members, the said spring extremities being provided with openings which the shanks of the bolts enter on opposite sides, a buffer located within the circle of the spring and suspended by the uppermost bolt, the latter being threaded into the uppermost spring-extremity-engaging block, and a plate located below the lowermost block, bearing members supported from the axle and which are grooved to receive said plate, the lowermost bolt being threaded into the last named plate and having a shoulder engaging the adjacent block.

12. The combination with the body and axle of a vehicle, of a spring composed of two approximately semi-circular members brought into suitable proximity to form an approximately circular device, the extremities of the two spring members being outwardly curved, plates applied to the body of the vehicle and having cylindrical parts which the upper extremities of the spring members movably engage, bearings supported by the axle and having parts extending below the same and carrying webs which the lower extremities of the spring members engage, blocks engaging the extremities of the spring members exteriorly, plates engaging the said extremities interiorly, and bolts passing through said plates and blocks, their shanks being located between the adjacent extremities of the spring members which are provided with openings to receive the shanks of the bolts on opposite sides, a buffer mounted on the inner extremity of the uppermost bolt, which is threaded into the uppermost block, a plate mounted in the bearing members below the spring extremities, the lowermost bolt being threaded into said plate, and having a shoulder which engages and supports the lowermost block, the buffer being located within the area of the circle of the spring and above the axle, substantially as described.

13. The combination with a vehicle body and axle, wheels which the axle extremities engage and to which they are made fast, a housing located between the wheels and through which the axle passes, a spring composed of two approximately semi-circular members brought together to form an approximately circular device, the extremities of the springs being outwardly curved, the body of the vehicle being equipped with parts which the uppermost extremities of the spring members movably engage in coöperative relation, bearings clamped to the axle housing and extending both above and below the same, the lower portions of these bearings having rounded webs which the lowermost extremities of the spring members movably engage, and means for supporting and guiding the spring extremities in coöperative relation with their engaging parts, substantially as described.

In testimony whereof I affix my signature in presence of two witnesses.

CICERO G. SMITH.

Witnesses:
H. G. CRISSEY,
E. R. CALDWELL,

Copies of this patent may be obtained for five cents each, by addressing the "Commissioner of Patents, Washington, D. C."